US011283708B1

(12) United States Patent
Troup

(10) Patent No.: US 11,283,708 B1
(45) Date of Patent: Mar. 22, 2022

(54) DEDICATING NETWORK PATHS BETWEEN COMPUTING RESOURCES IN A CLOUD PROVIDER NETWORK

(71) Applicant: Amazon Technologies, Inc., Seattle, WA (US)

(72) Inventor: Andrew Elliott Troup, Centreville, VA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 16/915,132

(22) Filed: Jun. 29, 2020

(51) Int. Cl.
| | |
|---|---|
| H04L 12/707 | (2013.01) |
| H04L 45/24 | (2022.01) |
| H04L 47/70 | (2022.01) |
| H04L 67/143 | (2022.01) |
| H04L 67/141 | (2022.01) |
| H04L 67/10 | (2022.01) |

(52) U.S. Cl.
CPC .............. *H04L 45/24* (2013.01); *H04L 47/82* (2013.01); *H04L 67/10* (2013.01); *H04L 67/141* (2013.01); *H04L 67/143* (2013.01)

(58) Field of Classification Search
CPC ....... H04L 45/24; H04L 47/70; H04L 47/726; H04L 47/82; H04L 47/827; H04L 67/10; H04L 67/141; H04L 67/143
See application file for complete search history.

(56) References Cited

U.S. PATENT DOCUMENTS

| | | | | |
|---|---|---|---|---|
| 10,320,644 | B1 * | 6/2019 | Chen | H04L 41/083 |
| 2014/0089510 | A1 * | 3/2014 | Hao | G06F 9/5072 |
| | | | | 709/226 |
| 2014/0366155 | A1 * | 12/2014 | Chang | H04L 67/1097 |
| | | | | 726/27 |
| 2018/0302243 | A1 * | 10/2018 | Li | H04L 49/70 |
| 2020/0162332 | A1 * | 5/2020 | Liguori | H04L 41/0896 |
| 2020/0341786 | A1 * | 10/2020 | Soryal | G06F 3/0605 |

* cited by examiner

*Primary Examiner* — Jeong S Park
(74) *Attorney, Agent, or Firm* — Nicholson De Vos Webster & Elliott LLP

(57) ABSTRACT

Techniques are described for enabling users of a cloud provider network to launch compute instances with the option to dedicate networking paths between the compute instances in an otherwise shared networking environment. A user can send, for example, a request to launch two or more compute instances, where the request further indicates a request for a dedicated networking path between the instances. A hardware virtualization service launches the requested compute instances and further sends signals to the computing devices at which the instances are launched indicating the request for a dedicated networking path. A computing device, upon receiving such a signal for a hosted instance, configures routing information at the computing device to dedicate, to the identified instance, an available network link accessible to the computing device and further propagates the signal to additional networking devices as needed to form a dedicated networking path between the associated compute instances.

20 Claims, 8 Drawing Sheets

DEDICATING NETWORK PATHS BETWEEN COMPUTING RESOURCES IN A CLOUD PROVIDER NETWORK

BACKGROUND

Computing devices typically utilize one or more communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, also referred to herein as "data centers," may include a number of interconnected computing systems to provide computing resources to users of the data center. The data centers may be private data centers operated on behalf of an organization or public data centers operated on behalf of, or for the benefit of, the general public.

BRIEF DESCRIPTION OF DRAWINGS

Various embodiments in accordance with the present disclosure will be described with reference to the drawings, in which.

DETAILED DESCRIPTION

Figure 1:
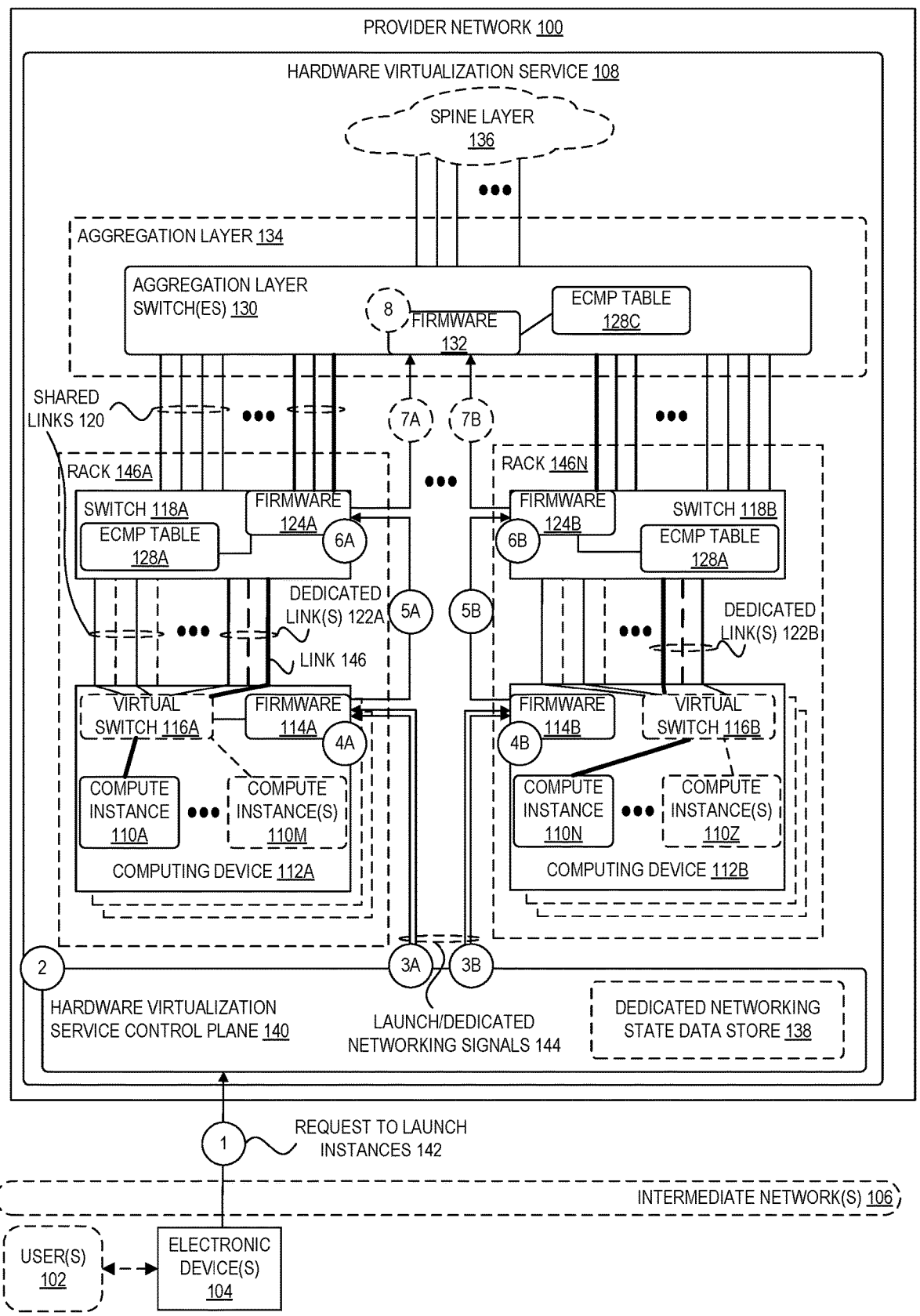
FIG. 1 is a diagram illustrating a cloud provider network environment in which users can launch compute instances and further request the establishment of dedicated networking paths between launched compute instances according to some embodiments.

The present disclosure relates to methods, apparatus, systems, and non-transitory computer-readable storage media for enabling users of a cloud provider network to launch compute instances with the option to have dedicated networking paths established between the compute instances in an otherwise shared networking environment. According to some embodiments, a user sends, to a hardware virtualization service of the cloud provider network, a request to launch two or more compute instances, where the request further indicates a request for a dedicated networking path between the instances. The hardware virtualization service launches the requested compute instances and, in some embodiments, further sends signals to the computing devices at which the instances are launched indicating the user's request for a dedicated networking path. A computing device, upon receiving such a signal, configures routing information at the computing device to dedicate, to the identified instance, an available network link used by the computing device. In some embodiments, the computing device further sends another dedicated network link signal to a next-hop networking device (e.g., a "top of rack" switch in the case of a rack-mounted computing device), which may similarly configure routing information at the networking device to dedicate network links for the instance (e.g., between the networking device and the computing device and possibly with yet another next-hop "aggregation layer" networking device). The one or more other computing devices hosting other computing instance(s) for which a dedicated networking path is desired follow a similar pattern, thereby tracing a dedicated path of network links through the networking fabric of a hardware virtualization service infrastructure. These dedicated networking paths can be used, for example, to improve the performance and security of high-performance, distributed workloads, among other benefits.

The computer networks present in the data centers of a cloud provider network typically include a large number of computing devices internetworked by layers of data switching devices. For example, a typical network in such a data center might include a vast number of computing devices (e.g., servers) installed in any number of server racks, where each computing device in a rack includes one or more uplinks (e.g., a wired or wireless network connection) to a "top of rack" (ToR) switch associated with the rack at which the device is installed. In some example data centers, these ToR switches are in turn connected to switches forming an aggregation layer, where each switch in the aggregation layer may be connected to any number of downstream ToR switches. These aggregation layer switches in turn may be connected to higher "spine" switches, and so forth, forming a hierarchical networking environment.

In networks such as those described above, network traffic may often be routed using various equal cost multi-path routing (ECMP) techniques. Whereas other routing strategies are typically more deterministic in the routes chosen for any given network traffic flow, ECMP is instead designed to load-balance network traffic across different routes at each hop between two devices. For example, when a computing device or network device has more than one next hop on which they can forward network traffic toward a given destination, where each of the resulting routes is associated with an approximately equal cost, ECMP randomly distributes (e.g., using a hash function and a corresponding modulus operation) network traffic flows destined for a given destination across a group of ports connected to those neighbors, with substantially the same probability of each path being selected for a given data flow. As such, ECMP approaches may provide a more balanced network traffic distribution in networks where the networking devices share pools of network links among networked computing devices in the same networked environment.

Some users of a cloud provider network, however, have distributed, high-performance workloads for which the users desire dedicated networking paths among compute instances implementing the workload. For example, a user implementing a high-performance computing application (e.g., a latency sensitive finance-related workload, a compute-intensive machine learning-based workload, etc.), may desire for the network links connecting two or more compute instances to be provisioned in a dedicated manner to the compute instances. In this manner, the compute instances can be assured of an amount of network capacity available for communications between the compute instances at any given time, thereby providing better performance by reducing network contention over the lifespan of the workload.

The aforementioned challenges, among others, are addressed by a hardware virtualization service including system components (e.g., a control plane, computing devices, networking equipment, and the like) that are capable of provisioning dedicated networking paths for users' workloads in an on-demand fashion. As described in more detail herein, in some embodiments, a control plane of a hardware virtualization service is configured such that, when a user launches compute instances, the user can further select an option to enable dedicated networking paths between the compute instances. In some embodiments, responsive to the user's selection, the control plane sends signals to the appropriate computing devices or other hardware to signify the user requested arrangement and to cause the configuration of a dedicated network path for the user's distributed workload.

FIG. 1 is a diagram illustrating a cloud provider network environment in which users can launch compute instances and further request dedicated networking paths between launched compute instances according to some embodiments. A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 (e.g., users 102) may utilize one or more user accounts that are associated with a customer account, though these terms may be used somewhat interchangeably depending upon the context of use. Users may interact with a provider network 100 using electronic device(s) (e.g., electronic device(s) 104) across one or more intermediate networks 106 (e.g., the Internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the cloud provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 100 can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

A cloud provider network 100 can include a physical network (e.g., sheet metal boxes, cables) referred to as the substrate. The cloud provider network 100 can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM may be provided with one or more IP addresses in the overlay network, and the VMM on a host may be aware of the IP addresses of the virtual machines on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service 108) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

The hardware virtualization service 108 (referred to in various implementations as an elastic compute service, a virtual machines service, a computing cloud service, a compute engine, or a cloud compute service) can enable users of the provider network 100 to provision and manage compute resources such as virtual machine instances (e.g., including compute instances 110A-110M and compute instances 110N-110Z running on computing device 112A and computing device 112B, respectively). Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components). Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). In some embodiments, the firmware 114A and firmware 114B, illustrated as part of computing device 112A and computing device 112B, respective, may be implemented in whole or in part by an offload card. Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, a computing device 112A and a computing device 112B further include a virtual switch 116A and a virtual switch 116B, respectively. A virtual switch is a software program that enables compute instances (e.g., compute instances 110A-110M and compute instances 110N-110Z) to connect to networks that are external to the computing device upon which the instances are running (e.g., a network accessible via a next hop switch 118A in the example of FIG. 1). In some embodiments, a virtual switch may be implemented in whole or in part by an offload card, as described above, or may execute separately on a computing device. In other embodiments, compute instances running on a computing device may access network links associated with the computing device using mechanisms other than a virtual switch. In some embodiments, a compute instance running on a computing device is associated with one or more virtual Ethernet adapters, each of which may be associated with its own IP address. Thus, the compute instances running on a computing device may have many of the same properties as a standalone physical machine from a networking standpoint.

In some embodiments, via a virtual switch or other mechanism, the compute instances running on a computing devices may have access to a shared pool of network links, e.g., corresponding to one or more physical network links connecting a computing device to one or more other networking devices. As illustrated in FIG. 1, the computing device 112A, for example, is associated with a pool of shared links 120 that may be generally usable by compute instances running on the computing device 112A. As described in more detail herein, in some embodiments, a computing device may also be associated with one or more dedicated network links based on requests to dedicate networking paths to particular compute instances (e.g., including dedicated links 122A between the computing device 112A and dedicated links 122A between the computing device 112B and the switch 118B).

In the example illustrated in FIG. 1, the computing device 112A may be part of a rack 146A (and computing device 112B part of a separate rack 146N), where a rack represents an enclosure for mounting multiple devices as commonly found in various types of data centers. In this arrangement, the switch 118A may be a "top of rack" switch that is mounted as part of the rack 146A and that is relatively closely coupled to the computing devices included in the same rack. As illustrated, in some embodiments, a switch 118A and a switch 118B includes firmware 126A and firmware 126B, respectively, wherein the firmware is capable of performing various types of modifications to configuration data used by the switches to make routing decisions, as described in more detail herein. In some embodiments, the configuration data includes routing information that uses equal-cost multi-path (ECMP) techniques, represented as an ECMP table 128A at switch 118A and ECMP table 128B.

As illustrated, the switches 118A and 118B may be further coupled to one or more aggregation layer switch(es) 130, which represent switches at an aggregation layer 134 representing a next highest hierarchy of a hierarchical networking infrastructure found in many data centers and other networked computing environments. In some embodiments, an aggregation layer switch 130 similarly includes firmware 132 that is capable of modifying routing configuration data, including data stored as part of an ECMP table 128C, among other operations. Although illustrated in FIG. 1 as firmware, in other embodiments, the firmware 124A-124C generally may be implemented as software, firmware, hardware, or any combination thereof. The aggregation layer switch(es) 130 may be further connected to switches at a spine layer 136, although other networking hierarchies may be used in other embodiments.

In FIG. 1, the circles numbered "1"-"8" illustrate an example process in which users can launch compute instances and further request dedicated networking paths between launched compute instances. Although the example illustrated in FIG. 1 is in the context of a hardware virtualization service 108 that provides users the ability to provision and manage compute capacity (e.g., VM instances), similar techniques can be used to dedicate network paths between other types of computing resources provided by other types of cloud provider network services (e.g., container services, on-demand code execution services, etc.). In some embodiments, the process generally includes a hardware virtualization service 108 receiving a request to launch two or more compute instances with a dedicated networking path, launching the requested compute instances at computing devices managed by the hardware virtualization service 108, and sending signals that cause the appropriate computing devices and networking devices to modify networking configurations to dedicate a network path for the launched instances.

In some embodiments, at circle "1," a hardware virtualization control plane 140 receives, from a user 102 using an electronic device 104, a request 142 to launch two or more compute instances (e.g., including a compute instance 110A and a compute instance 110N). Communications between the electronic device 104 and the provider network 100, such as the request specifying the one or more placement preferences, can be routed through interface(s), such as through use of application programming interface (API) calls, via a console implemented as a website or application, and so forth. In some embodiments, the request to launch the two or more compute instances includes various launch parameters for launching the instances. For example, the launch parameters can include the specification of a machine image that includes information used to create a new instance (e.g., including the software to act as an application server, web server, or any other user-selected application type), a type of instance (e.g., associated with a particular hardware configuration), scaling options, networking options, security options, and the like.

Figure 2:
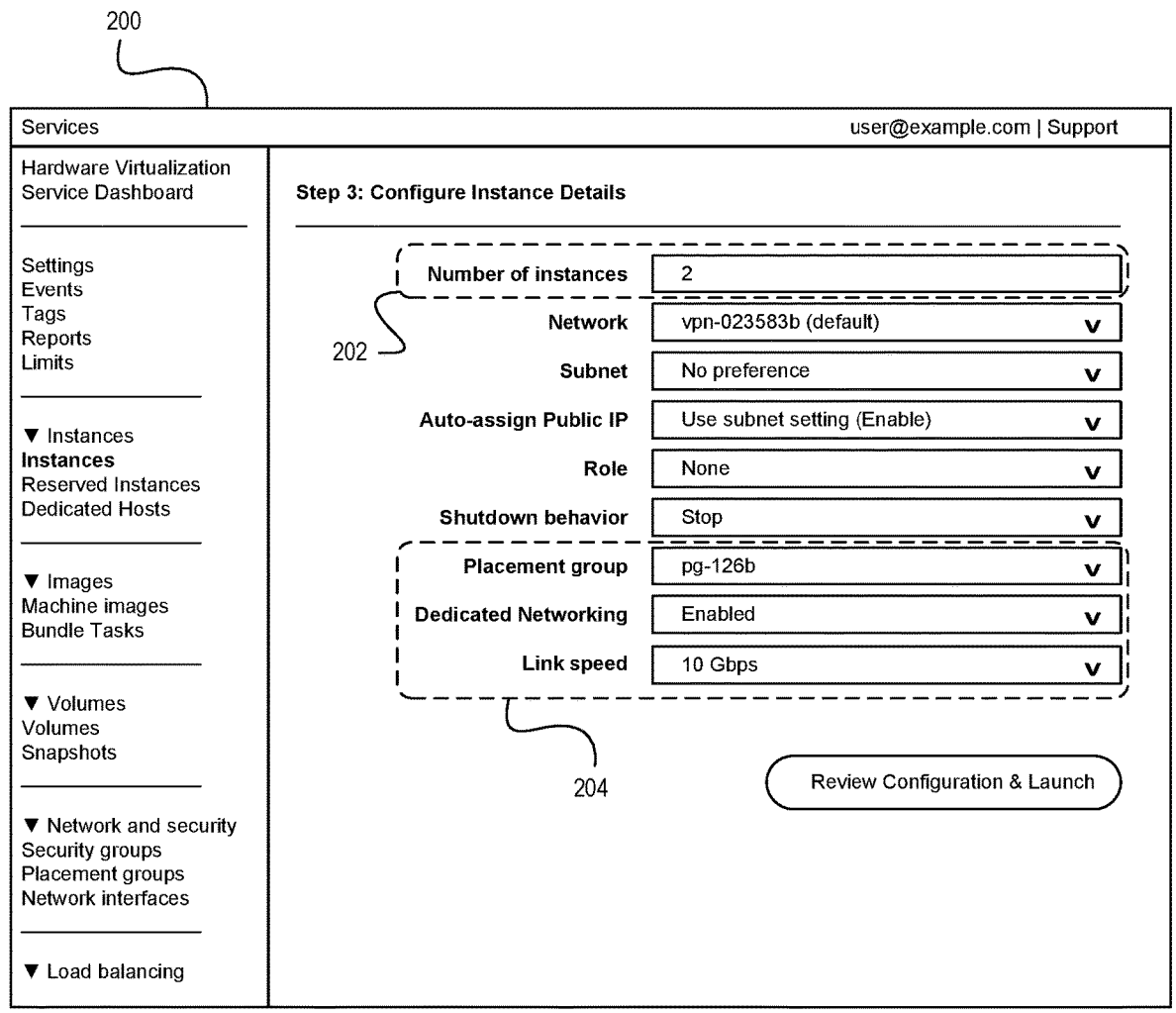
FIG. 2 is a diagram illustrating an example web-based console used to configure the launch of compute instances by a hardware virtualization service and further to request dedicated networking paths between launched compute instances according to some embodiments.

In some embodiments, the hardware virtualization service 108 further enables users to include a launch parameter indicating a request to dedicate networking between instances, for example, by providing an option as part of a web-based console, API, or other interface. FIG. 2 illustrates an example web-based console interface that enables a user to configure the launch of compute instances and to request dedicating network links between the instances. As shown, a graphical user interface (GUI) 200 includes various interface elements that enable a user to configure various launch parameters associated with an instance launch. The interface element 202, for example, enables a user to specify a number of instances to be launched, while the interface elements 204 enable a user to configure the launch of the instances into a processing cluster (sometimes referred to as a "placement group") and to indicate whether dedicated networking is desired. In some embodiments, the interface elements 204 also include an option to specify a desired dedicated network throughput for the dedicated networking path (e.g., 1 Gbps, 5 Gbps, 10 Gbps, 100 Gbps, etc.). Once configured, the user can provide input to review and launch the instances based on the specified configuration.

As indicated above, in some embodiments, the request to launch compute instances can include a request to launch the compute instances into a "processing cluster" or "placement group." A processing cluster, for example, can be used by a hardware virtualization service 108 to influence the placement of a collection of interdependent instances (e.g., influence the selection of computing devices at which instances are launched). In some embodiments, a hardware virtualization service 108 supports multiple different types of processing clusters or placement groups, including "cluster" placement groups (e.g., used when it is desired to place instances close together within the networking fabric of a hardware virtualization service), "partition" placement groups (e.g., used when it is desired to spread instances across logical partitions for distributed and replicated workloads), and "spread" placement groups (e.g., to place small groups of instances across distinct underlying hardware to reduce correlated failures). In the context of high-performance workload scenarios described herein, for example, a user might request for the instances to be launched into a cluster placement group so that the compute instances are placed close to one another in the hardware virtualization service infrastructure (e.g., at computing devices located in server racks with relatively short network paths). As indicated herein, while a cluster placement group can be used to place instances close together in a networked computing environment used by a hardware virtualization service 108, the network links between the compute instances may generally remain shared among compute instances in the same networked environment (e.g., possibly including other compute instances associated with the same user or with other users of the multi-tenant cloud provider network).

In some embodiments, at circle "2," the hardware virtualization service control plane 140 receives and processes the request 142 to launch the two or more compute instances. In some embodiments, an instance launch process performed by a hardware virtualization service control plane 140 includes, for example, determining whether sufficient capacity exists to satisfy the request (e.g., including a sufficient amount of compute capacity available to support the compute instances and a sufficient amount of networking capacity to support the dedication of a networking path to the instances), identifying particular computing devices at which the launch the compute instances, and sending instructions to the selected computing devices to launch the instances, as described in more detail hereinafter.

In some embodiments, the hardware virtualization service control plane 140 evaluates a launch request against one or more policies to determine whether the launch can proceed. Exemplary policies include checking the requesting user's creditworthiness, whether the user has any limits imposed on the number of instances they can launch, and whether the request might lead to resource shortages within the fleet (e.g., both in terms of available instance capacity and network capacity). For example, the hardware virtualization service control plane 140 may fetch capacity information from an internal or external capacity tracker service. In some embodiments, the capacity information includes a number of available "slots" in a given fleet or server pool (for example, the total number of available compute instance slots in an associated server pool including computing device 112A and computing device 112B) and a threshold at which the control plane 140 should begin to limit the number of requests that are admitted. The control plane 140 evaluates the launch request 142 against the capacity information and, in some cases, may reject a launch request. In cases where the control plane rejects a request for capacity or other reasons, the control plane frontend or other interfaces to provide an indication of the reason for failure to the customer. Otherwise, the control plane allows the launch request.

In some embodiments, a placement service of the hardware virtualization service control plane 140 evaluates the state of the fleet of computing devices managed by the service, the one or more launch properties associated with the launch, and any user-specified placement preferences to determine where to launch an instance (e.g., including a request to launch the instances into a cluster placement group). The fleet may include numerous physical servers, each with varying properties and amounts of available capacity. The placement service identifies a location for the requested instances by evaluating these various parameters. Such placement information can include an identifier of the physical server (e.g., identifiers of a computing device 112A and a computing device 112B) within a fleet on which to launch the instance(s), and a slot identifier to logically track the usage of those resources within the fleet. In some embodiments, the placement service also sends updated capacity usage information to the capacity tracking service so that the capacity tracking service can update its capacity information. Note that in situations where a user has requested the launch of more than one instance, the control plane may serialize placement requests to the placement service.

After identifying the computing devices at which to launch the instances, the control plane 140 performs a workflow to configure and launch the instances according to one or more parameters, such as the compute, memory, network, storage, or other configuration settings. The control plane 140, at circles "3A" and "3B," communicates with the physical computing devices designated to host the instance by sending one or more messages to configure and launch the instance. For example, in some embodiments, the control plane 140 causes firmware (which may part of an offload card including one or more processors, a local memory, physical network interfaces, and so forth) that is a part of (that is, coupled with) a computing device to launch the compute instances. The firmware (e.g., firmware 114A and firmware 114B) or offload card may implement a virtualization manager that can manage, for example, virtual machine compute instances that execute on a host electronic device, independent of a hypervisor or in combination with a hypervisor that executes using the traditional CPU(s) of the electronic device. For example, in some embodiments, the virtualization manager implemented by the offload card can instantiate and/or terminate compute instances, thus eliminating the need for the hypervisor to perform these tasks, which can improve the performance of the virtual machines themselves due to not having to compete for resources with the hypervisor.

Alternatively, in some embodiments, the control plane 140 interacts with a hypervisor (for example, via a VM management server) to cause the compute instance(s) to be launched. In either case, the control plane 140 causes the physical server to create a virtual machine or other environment with the requested hardware configuration (for example, with access to a local solid-state drive, with two network interfaces, access to a local graphics accelerator, four cores, and 8 gigabytes of memory) and software configuration (e.g., executing a machine image that includes a Linux or other operating system, etc.). Continuing the launch example in FIG. 1, the control plane 140 causes a compute instance 110A to be launched at computing device 112A and a compute instance 110N to be launched at computing device 112B.

In some embodiments, further at circles "3A" and "3B," one or more dedicated networking signals are sent to the computing devices at which the compute instances are launched requesting the dedication of a networking path for the compute instances (e.g., a dedicated networking path between the compute instance 110A and the compute instance 110N), where such requests may be part of the requests to launch the compute instances or may be sent separately. In some embodiments, the dedicated networking signals 144 or other messages may similarly be sent to firmware 114A and firmware 114B coupled to the computing devices and may identify the request to dedicate the networking path and include an identifier of the instance(s) for which the dedicated networking is desired. For example, in some embodiments, the instances may be identified by an instance identifier associated with the instances by the hardware virtualization service 108.

In some embodiments, at circles "4A" and "4B," the computing device 112A and the computing device 112B receive and process the requests to dedicate a networking path between compute instance 110A and compute instance 110N. In some embodiments, the dedication of the networking path between the compute instances generally involves the dedication of one or more uplinks associated with the respective compute instances (e.g., uplinks selected from a shared pool of uplinks available at the associated computing devices) up to a networking device that includes a downstream path to both of the associated computing devices. In the example illustrated in FIG. 1, the dedication of a networking path between the compute instance 110A and the compute instance 110N involves the dedication of a network link between the computing device 112A and the switch 118A, between the switch 118A and an aggregation layer switch 130 (which has a downstream networking path to both of the relevant computing devices), between the computing device 112B and the switch 118B, and between the switch 118B and the aggregation layer switch 130. In other examples, the number of network links involved may be more or less depending on a distance between the computing devices in terms of network hops. The dedication of the network links between each of these devices, for example, results in an end-to-end dedicated network path between the compute instances such that network communications can occur without the use of network links that are a part of shared link pools.

In some embodiments, at circle "4A" for example, the firmware 114A selects a dedicated link 146 for the compute instance 110A from a pool of shared network links connecting the computing device 112A to the switch 118A. The dedicated link 146 may be one of possibly multiple dedicated links 122A associated with the computing device 112A, e.g., including other network links dedicated to the same compute instance 110A or to other compute instances running on the computing device 112A. In some embodiments, the dedicated link 146 involves a dedicated network interface/port available to compute instances at the computing device 112A and thus may involve the firmware 114A modifying networking configuration (e.g., associated with a virtual switch 116A) such that network traffic sent by or destined for the compute instance 110A is routed using the network interface/port associated with the link 146. In some embodiments, a similar process occurs at the computing device 112B, wherein a dedicated link is selected for the compute instance 110N. In the example of FIG. 1, the set of dedicated links forming the path between the compute instance 110A to the compute instance 110N, e.g., are illustrated using connecting lines that are thicker than those representing the other network links between the computing devices.

In some embodiments, once a dedicated network link is configured at the computing device 112A (and similarly at computing device 112B), at circles "5A" and "5B," each of computing device 112A and computing device 112B sends an additional dedicated networking signal to the switch 118A and switch 118B, respectively, and at circles "6A" and "6B," the switch 118A and switch 118B process the respective signals. While part of a same overall process, the processes performed at circles "4A," "4B," "5A," "5B," "6A," "6B," "7A," "7B," and "8" generally are not synchronized and may be performed in any order relative to one another. For example, the propagation of the dedicated networking signal from the computing device 112A to the switch 118A and to the aggregation layer switch 130 in FIG. 1 may be independent from the propagation of the dedicated networking signal from the computing device 112B to the switch 118B and to the aggregation layer switch 130. In some embodiments, responsive to receiving the dedicated networking signal indicating the desire to allocate the dedicated network links for the compute instance 110A, the switch 118A similarly modifies networking configurations at the switch to dedicate the links.

Figure 3:
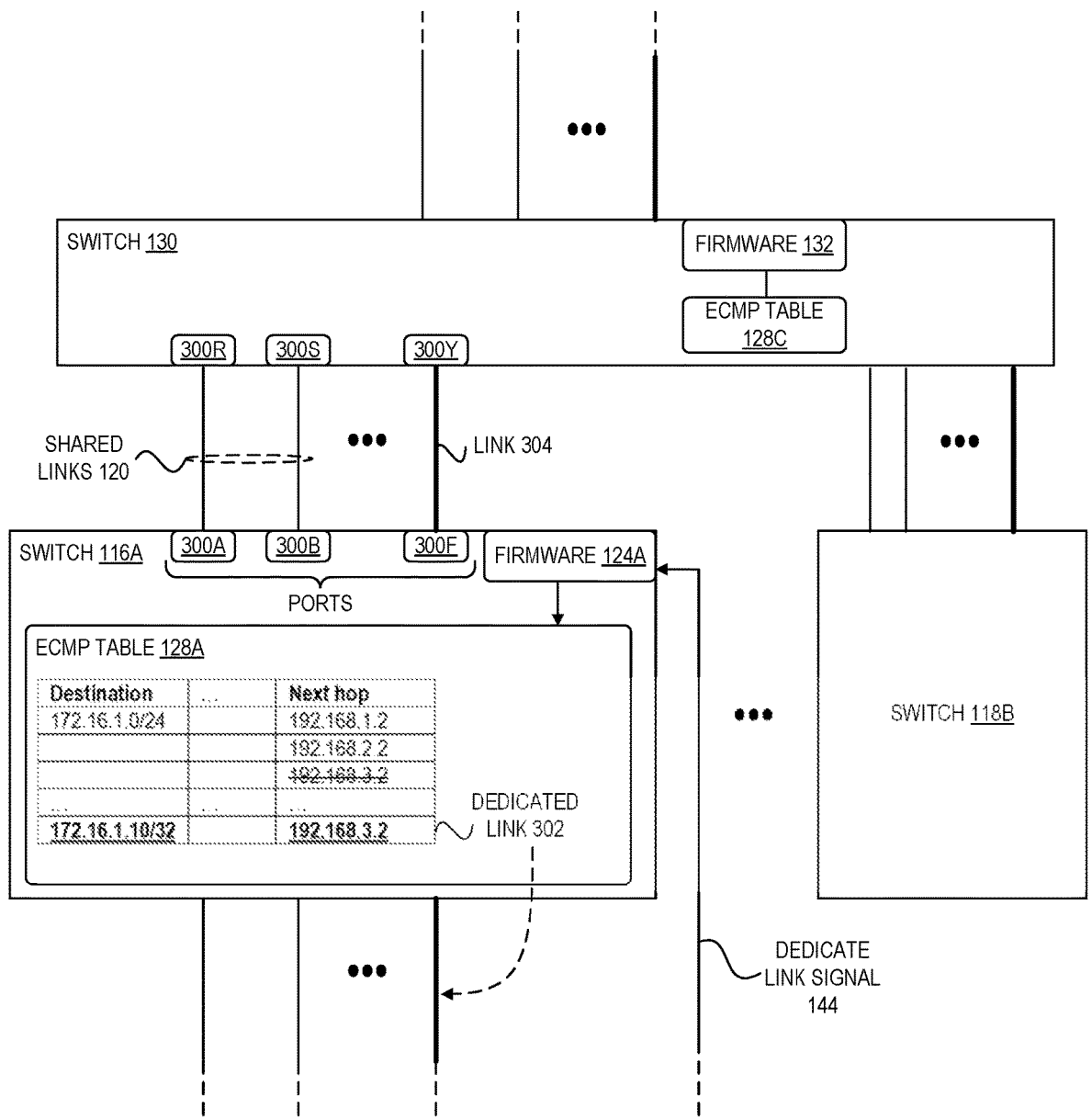
FIG. 3 is a diagram illustrating an environment in which a networking device modifies an equal-cost multi-path (ECMP) set of a routing table responsive to a request to dedicate network links for a compute instance in a hardware virtualization service according to some embodiments.

FIG. 3 is a diagram illustrating an example environment in which a networking device modifies an equal-cost multipath (ECMP) set of a routing table responsive to a request to dedicate network links for a compute instance in a hardware virtualization service according to some embodiments. As indicated above, responsive to a switch 116A receiving a signal to dedicate network links to a compute instance 110A, the switch modifies networking configurations at the device to dedicate the network links, e.g., including data stored in an ECMP table 128A. As illustrated in FIG. 3, an ECMP table 128A may include any number of routing entries, each of which may include an ECMP set indicating that network traffic associated with particular network traffic flows (e.g., network traffic associated with a particular destination address, source address, protocol, etc., or any combination thereof) may be routed using any of a set of next hops, e.g., based on use of a hashing technique to select a next hop from the set.

In some embodiments, a dedicate link signal 144, for example, may include an identifier of a compute instance for which dedicated links are desired, an IP address of the compute instance, an identifier of a network interface/port dedicated by the computing device from which the signal 144 is received, or any other similar information. In some embodiments, responsive to receiving the signal 144, the firmware 124A modifies the ECMP table 128A to remove one or more relevant routes associated with the compute instance for which dedicated network links are desired from one or more ECMP sets that would otherwise be relevant to the compute instance. As shown in the example of FIG. 3, a dedicated link 302 associated with a compute instance for which dedicated networking is desired is removed from an ECMP set so that network traffic associated with the compute instance is routed instead using only a specific, dedicated route. The firmware 124A may further select and dedicate an uplink 304 from a set of shared links 120 connecting the switch 116A to the aggregation layer switch 130, where the dedication of the uplink 304 also results in the modification of the ECMP table 128, e.g., to associate a particular port (e.g., port 300F associated with a particular IP address) with network traffic for the relevant compute instance. In some embodiments, the switch 116A may then further propagate an additional link dedication signal to the switch 130, where the signal identifies the port or interface dedicated by the switch 116A for the instance so that the switch 130 can dedicate a same corresponding port (e.g., a port 300Y) at the switch 130 for the instance. As indicated above, a similar process may occur at a switch 118B based on the propagation of a link dedication signal originating from another computing device hosting a different compute instance with which the dedicated networking is desired.

Returning to FIG. 1, in some embodiments, at circles "7A" and "7B," the switch 118A and switch 118B propagate the dedicated networking signals to an aggregation layer switch 130, which has a downstream networking path to each of compute instance 110A and compute instance 110N. As indicated above, in other examples, more or fewer levels of switches may be involved in the dedicated networking configuration depending on a distance between the computing devices in a hierarchical networking environment (e.g., if instead both the compute instance 110A and the compute instance 110N were located in a same rack 146A, then only configuration of the switch 118A may be needed to create the sufficient set of dedicated links to form a path between the computing devices; in other examples, networking devices in a spine layer 136 may be configured to dedicate links between more distant computing devices. In some embodiments, at circle "8," the aggregation layer switch 130 similarly modifies networking configurations stored as part of an ECMP table 128C to dedicate network links between the aggregation layer switch 130 and the switch 118A and the aggregation layer switch 130 and the switch 118B, thus forming an end-to-end dedicated networking path between the compute instance 110A running on the computing device 112A and the compute instance 110N running on the computing device 112B.

Figure 4:
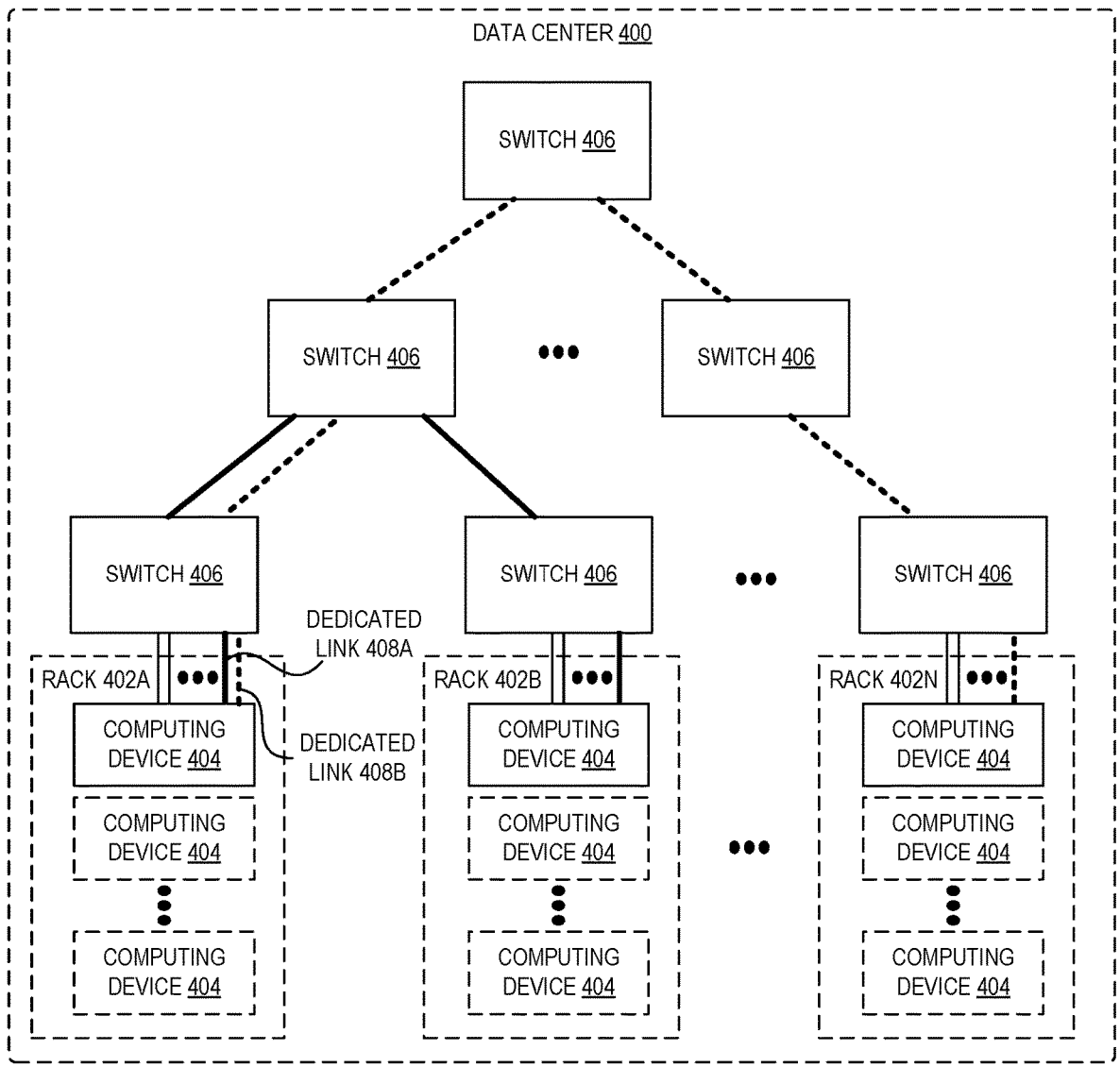
FIG. 4 is a diagram illustrating a hierarchically networked data center environment and further illustrating the variable number of network links required to dedicate a networking path to compute instances based on instance placement according to some embodiments.

To further illustrate, FIG. 4 illustrates a hierarchically networked data center environment and illustrating the variable number of network links required to dedicate a networking path to compute instances based on instance placement according to some embodiments. The illustrated data center 400, for example, includes any number of separate racks 402A, 402B, . . . 402N, each of which may include any number of computing devices 404. The computing devices in the racks may be internetworked via any number of intermediary switches that form a hierarchical network infrastructure, where communications between computing devices closer to one another (e.g., in a same rack) involve fewer network links compared to more distant computing devices. Thus, as shown, a dedicated networking path, including a dedicated link 408A, between a computing device in a rack 402A and a rack 402B may involve fewer network links compared to a dedicated networking path, including a dedicated link 408B, between a computing device in the rack 402A and a rack 402N. This difference can affect, for example, a maximum available networking performance between the associated computing devices and, in some cases, can affect the ability to establish such a dedicated networking path altogether depending on the availability of network links throughout the network.

In some embodiments, as part of tracking the availability of network links for dedication, FIG. 1 further illustrates a dedicated networking state data store 138. Although illustrated as a component of the hardware virtualization service control plane 140, the data store 138 generally may be any type of centralized or distributed data store accessible to the control plane 140 and other components of the hardware virtualization service 108. In some embodiments, the dedicated networking state data store 138 generally tracks the state of network links between computing devices and networking devices (e.g., including an indication of network links that are shared, network links that are dedicated, an amount of networking capacity associated with the network links, how much networking capacity is being used, etc.).

In some embodiments, the selection of a link to dedicate to a compute instance by a computing device or networking device involves querying the dedicated networking state data store 138 to determine whether sufficient network capacity is available to dedicate one or more network links. For example, if the dedicated networking state data store 138 indicates that network capacity associated with a shared pool of links connecting a computing device and a networking device associated with a proposed dedicated networking path exceeds a defined threshold (e.g., indicating that the shared pool of links are in relatively high demand by devices connected via the devices), the request to dedicate a network link may be denied to ensure that sufficient capacity remains available for use by other instances. In some embodiments, the hardware virtualization service control plane 140 may return an error message to a user indicating that the dedicated networking request cannot be satisfied or, in some embodiments, may attempt to migrate one or more of the involved compute instances to other computing devices associated with more available networking capacity. In some embodiments, information contained in the dedicated networking state data store 138 may be used by a hardware virtualization service control plane 140 during the initial placement processes to try to place instances on computing devices where an associated dedicated networking request is likely to be satisfied.

In some embodiments, the resources associated with a dedicated networking path may undergo various teardown processes, e.g., in response to a request to a user terminating one or more instances associated with a dedicated networking path, specifically requesting to release the resources associated with a dedicated networking path, or in response to other conditions. In some embodiments, the hardware virtualization service control plane 140 may send signals to tear down dedicated networking paths in a manner similar to the signals used to construct a dedicated network path, where the signals may cause various involved computing devices and networking devices to modify networking configuration information to release dedicated network links to shared pools of network links (e.g., by modifying ECMP tables to remove dedicated routes so that the associated network traffic is again routed using ECMP techniques).

In some embodiments, users can request reservations of dedicated networking paths for two or compute instances, where the compute instances may be currently running or are to be launched in the future. For example, a dedicating networking path reservation may be used to ensure that sufficient networking capacity is available to establish a dedicated networking path for a user's compute instances upon demand at some point in time in the future. In some embodiments, responsive to receiving a request to obtain a dedicated networking path reservation, the hardware virtualization service control plane 140 may analyze data stored in a dedicated networking state data store 138 to identify a set of network links that can be reserved for the establishment of the requested dedicated networking path. In some embodiments, based on an identified set of network links, the hardware virtualization service control plane 140 stores a dedicated network path reservation including data representing a set of network links to be used to establish the dedicated networking path upon request. Upon receiving a request to use a created reservation, the hardware virtualization service control plane 140 can then send dedicated networking signals, as described above, to establish the dedicated links upon request.

Although many of the examples herein are described in the context of a networked computing environment in a data center managed by a cloud provider network, the provisioning of dedicated networking paths between compute instances can be provided in other IT environments as well. For example, in some embodiments, similar networked computing environments may be provided as provided substrate extensions. A provider substrate extension, or "PSE," provides resources and services of the cloud provider network 100 within a separate network, thereby extending functionality of the cloud provider network 100 to new locations (e.g., at a cloud provider-managed facility separate from those typically associated with the cloud provider network 100, at a facility managed by a communications service provider, at an on-premise data center or other facility managed by a customer of the cloud provider network 100, among other possible types of substrate extensions).

In some embodiments, a PSE can similarly include a logical separation between a control plane and a data plane, respectively extending the control plane and data plane of the cloud provider network 100. A PSE may be pre-configured, e.g. by the cloud provider network operator, with an appropriate combination of hardware with software and/or firmware elements to support various types of computing-related resources, and to do so in a manner that mirrors the experience of using the cloud provider network. For example, one or more servers can be provisioned by the cloud provider for deployment within a PSE.

In some embodiments, servers at a PSE can host one or more compute instances. The servers within a PSE may also, in some implementations, host certain local control plane components, for example, components that enable the PSE to continue functioning if there is a break in the connection back to the cloud provider network 100. Examples of these components include a migration manager that can move compute instances between provider substrate extension servers if needed to maintain availability, and a key value data store that indicates where volume replicas are located. However, generally the control plane functionality for a PSE remains in the cloud provider network 100 in order to allow customers to use as much resource capacity of the provider substrate extension as possible.

Server software running at a PSE may be designed by the cloud provider to run on the cloud provider substrate network, and this software may be enabled to run unmodified in a PSE by using local network manager(s) to create a private replica of the substrate network within the PSE (a "shadow substrate"). The local network manager(s) can run on PSE servers and bridge the shadow substrate with the PSE network, for example, by acting as a virtual private network (VPN) endpoint or endpoints between the PSE and proxies in the cloud provider network 100 and by implementing a mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) allow resources in the PSE to seamlessly communicate with resources in the cloud provider network 100. In some implementations, a single local network manager can perform these actions for all servers hosting compute instances in a PSE. In other implementations, each of the servers hosting compute instances may have a dedicated local network manager. In multi-rack PSEs, inter-rack communications can go through the local network managers, with local network managers maintaining open tunnels to one another.

As indicated above, the ability to provisions dedicated networking paths can be extended to dedicated networking paths between compute instances provisioned in a PSE. For example, similar to process described in relation to FIG. 1, a user associated with a PSE can request (e.g., via a web-based console, CLI, APIs, etc.) the launch of two or more compute instances into a PSE and further request dedicated networking for the launched instances. Responsive to the request, a hardware virtualization service 108 can send detected networking signals to the relevant computing devices, which may be located in PSE facility separate from the cloud provider network 100, where such signals instruct firmware or other executable logic at the computing devices to perform the appropriate networking configuration modifications. The computing devices may then further propagate the dedicated networking signals to one or more networking devices of the PSE and needed.

Figure 5:
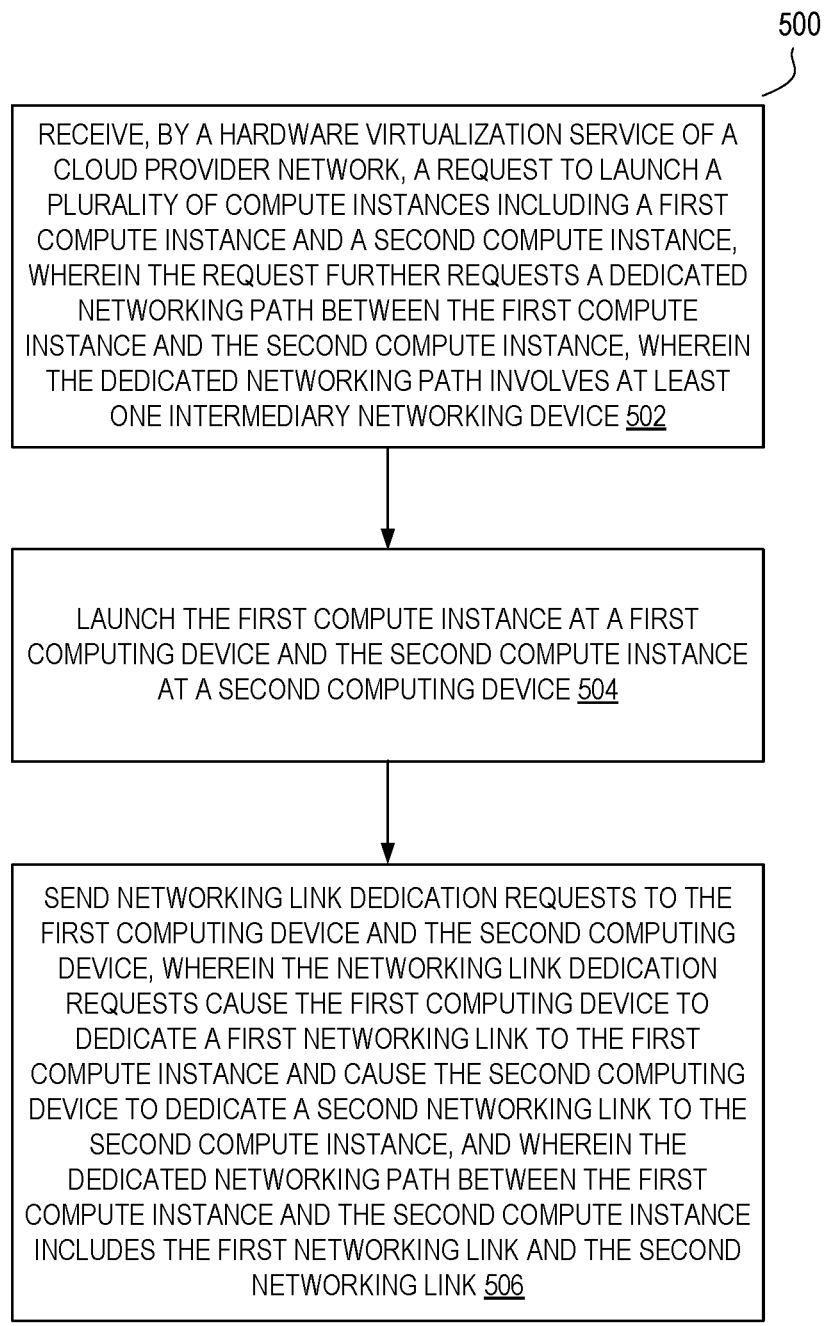
FIG. 5 is a flow diagram illustrating operations of a method for enabling users to request the launch of compute instances with a dedicated networking path between the compute instances in a cloud provider network according to some embodiments.

FIG. 5 is a flow diagram illustrating operations 500 of a method for enabling users to request the launch of compute instances with a dedicated networking path between the compute instances in a cloud provider network according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by components of a hardware virtualization service 108 of the other figures.

The operations 500 include, at block 502, receiving, by a hardware virtualization service of a cloud provider network, a request to launch a plurality of compute instances including a first compute instance and a second compute instance, wherein the request further requests a dedicated networking path between the first compute instance and the second compute instance, wherein the dedicated networking path involves at least one intermediary networking device.

The operations 500 further include, at block 504, launching the first compute instance at a first computing device and the second compute instance at a second computing device.

The operations 500 further include, at block 506, sending network link dedication requests to the first computing device and the second computing device, wherein the network link dedication requests cause the first computing device to dedicate a first network link to the first compute instance and cause the second computing device to dedicate a second network link to the second compute instance, and wherein the dedicated networking path between the first compute instance and the second compute instance includes the first network link and the second network link.

In some embodiments, the network link dedication requests cause the first computing device to send, to a networking device of the at least one intermediary networking device, an additional network link dedication request, and wherein the additional network link dedication request causes the networking device to dedicate a network link to the first compute instance by removing a route associated with the first compute instance from an equal-cost multi-path (ECMP) set specified in a routing table of the networking device.

In some embodiments, the network link dedication requests cause the first computing device to send, to a networking device of the at least one intermediary networking device, a first additional network link dedication request, wherein the additional network link dedication request causes the networking device to send a second additional network link dedication request to an aggregation layer switch to dedicate a network link to the first compute instance, and wherein the aggregation layer switch dedicates the network link by removing a route associated with the first compute instance from an equal-cost multi-path (ECMP) routing table at the aggregation layer switch.

In some embodiments, the hardware virtualization service includes a data store storing state information about network links managed by the hardware virtualization service, and wherein the data store indicates, for each of a plurality of network links, a pair of devices connected by the network link, whether the network link is part of a shared pool of network links or dedicated to a compute instance, and performance characteristics of the network link; and wherein the method further comprises updating the data store to reflect the dedication of network links for the dedicated networking path.

In some embodiments, the hardware virtualization service includes a data store storing state information about network links managed by the hardware virtualization service, wherein the state information about the network links includes network capacity information associated with the network links and with a networked computing environment in which the first compute instance and second compute instance operate, and wherein the method further comprises determining, based on state information stored in the data store, whether sufficient networking capacity exists to dedicate network links for the dedicated networking path.

In some embodiments, the operations further include receiving a request to release network links of the dedicated networking path back into one or more shared pools of network links; and sending dedicated network link release requests to the first computing device and to the second computing device, wherein the dedicated network link release requests cause the first computing device to release the first network link to a first shared pool of network links associated with the first computing device and further cause the second computing device to release the second network link to a second shared pool of network links associated with the second computing device.

In some embodiments, the first compute instance and the second compute instance implement at least a portion of a distributed workload, and wherein execution of the distributed workload involves the exchange of network traffic between the first compute instance and the second compute instance using the dedicated networking path.

In some embodiments, the request identifies a processing cluster into which the compute instances are to be launched, and wherein the hardware virtualization service places the first compute instance and the second compute instance at the first computing device and the second computing device according to a placement strategy associated with the processing cluster.

In some embodiments, the operations further include receiving a request to reserve a dedicated networking path for two or more compute instances; and storing a dedicated network path reservation including data representing a set of network links to be used to establish the dedicated networking path upon request.

In some embodiments, the at least one intermediary networking device is part of a networking environment including a hierarchy of networking devices connecting computing devices of one or more data centers in which the hardware virtualization service provisions compute instances.

In some embodiments, the network link dedication requests are sent to the first computing device and to the second computing device using network link dedicated to control signal information sent and received by the first computing device and the second computing device.

In some embodiments, the first computing device and the second computing device are located in a provider substrate extension that is separate from the cloud provider network.

Figure 6:
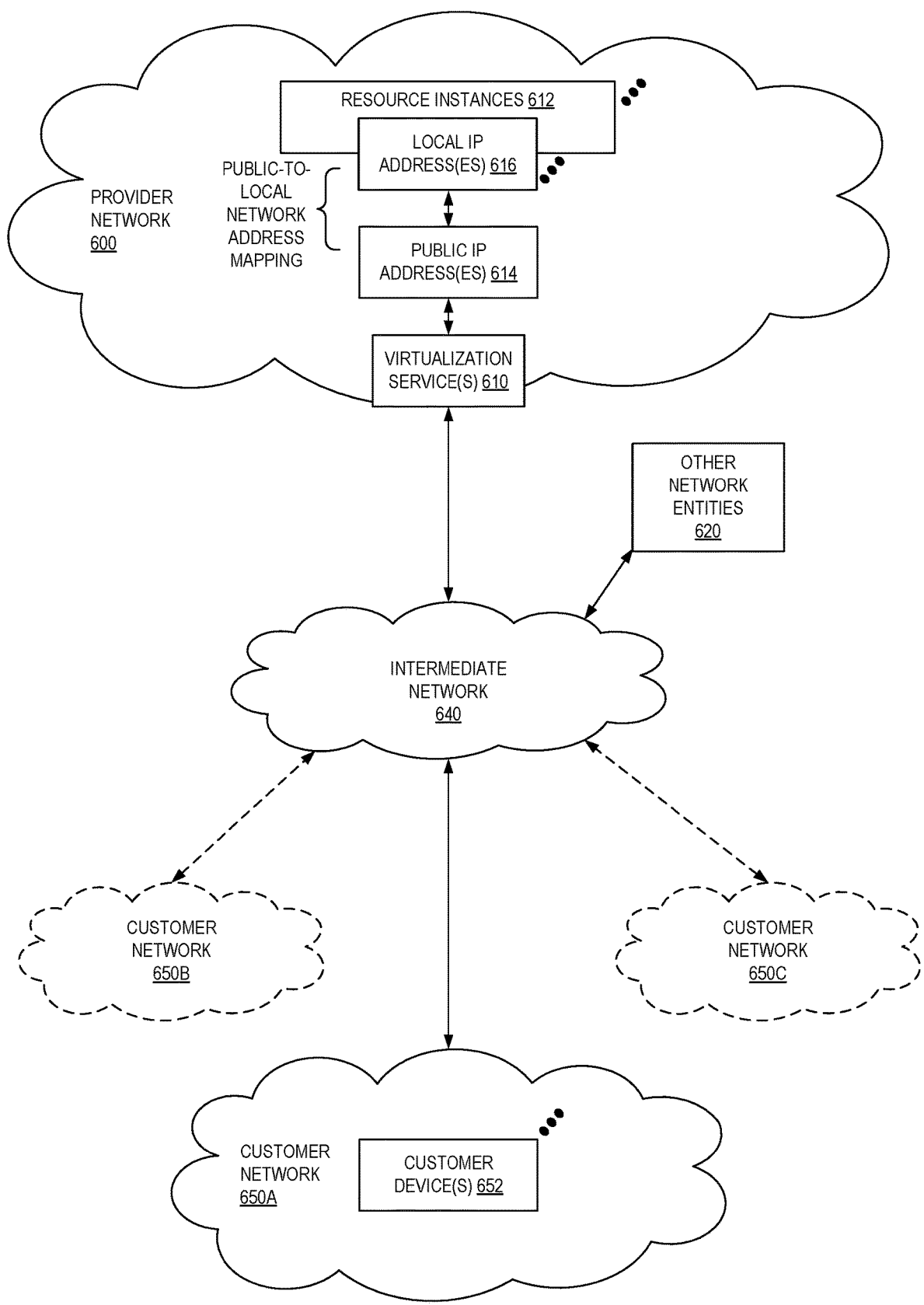
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
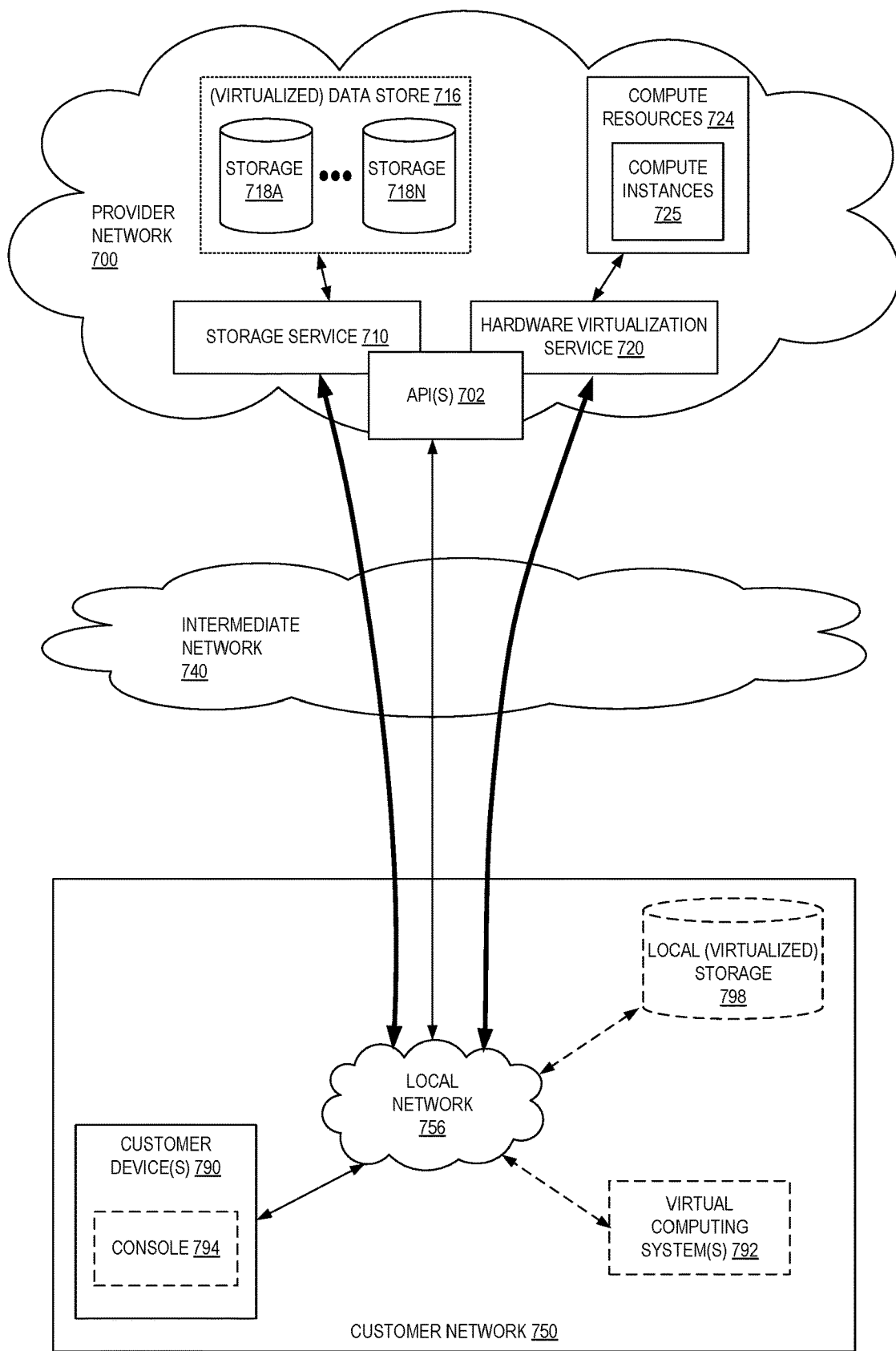
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A–718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
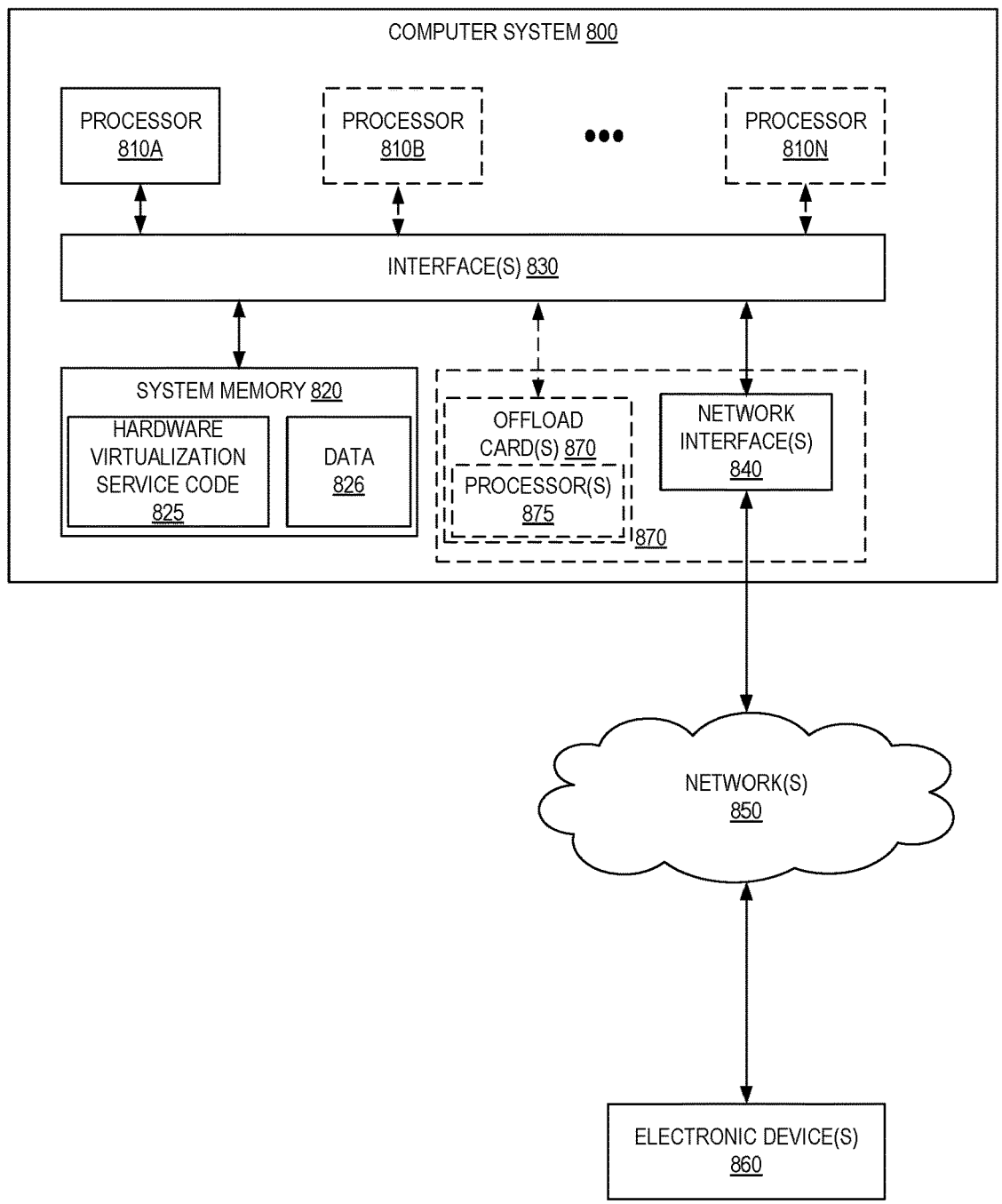
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as hardware virtualization service code 825 (e.g., executable to implement, in whole or in part, the hardware virtualization service 108) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a hardware virtualization service of a cloud provider network, a first request to launch a plurality of compute instances including a first compute instance and a second compute instance, wherein the request further requests a dedicated networking path between the first compute instance and the second compute instance;
   launching the first compute instance at a first computing device, wherein the first computing device is associated with a first plurality of network links to a first networking device, and wherein the first plurality of network links are shared by first compute instances running on the first computing device;
   launching the second compute instance at a second computing device, wherein the second computing device is associated with a second plurality of network links to a second networking device, and wherein the second plurality of network links are shared by second compute instances running on the second computing device;
   sending, to the first computing device, a second request to dedicate, to the first compute instance, a first network link of the first plurality of network links, wherein the second request causes the first computing device to select a first particular network link of the first plurality of network links to dedicate to the first compute instance, and wherein the second request further causes the first computing device to send a third request that causes one or more first networking devices including the first networking device to dedicate network links to the first compute instance; and sending a fourth request to the second computing device to dedicate, to the second compute instance, a second network link of the second plurality of network links, wherein the fourth request causes the second computing device to select a second particular network link of the second plurality of network links to dedicate to the second compute instance, and wherein the fourth request causes the second computing device to send a fifth request that causes one or more second networking devices including the second networking device to dedicate network links to the second compute instance.

2. The computer-implemented method of claim 1, wherein the third request causes the first networking device to dedicate the first particular network link by removing a route associated with the first compute instance from an equal-cost multi-path (ECMP) set specified in a routing table of the first networking device.

3. The computer-implemented method of claim 1, wherein the third request further causes the first networking device to send a fifth request to an aggregation layer switch to dedicate a third network link of a third plurality of network links available at the aggregation layer switch to the first compute instance, and wherein the aggregation layer switch dedicates the third network link by removing a route associated with the first compute instance from an equal-cost multi-path (ECMP) routing table at the aggregation layer switch.

4. A computer-implemented method comprising:
receiving, by a hardware virtualization service of a cloud provider network, a request to launch a plurality of compute instances including a first compute instance and a second compute instance, wherein the request further requests a dedicated networking path between the first compute instance and the second compute instance, wherein the dedicated networking path involves at least one intermediary networking device;

launching the first compute instance at a first computing device and the second compute instance at a second computing device; and sending network link dedication requests to the first computing device and the second computing device, wherein the network link dedication requests cause the first computing device to dedicate a first network link to the first compute instance and cause the second computing device to dedicate a second network link to the second compute instance, and wherein the dedicated networking path between the first compute instance and the second compute instance includes the first network link and the second network link.

5. The computer-implemented method of claim 4, wherein the network link dedication requests cause the first computing device to send, to a networking device of the at least one intermediary networking device, an additional network link dedication request, and wherein the additional network link dedication request causes the networking device to dedicate a network link to the first compute instance by removing a route associated with the first compute instance from an equal-cost multi-path (ECMP) set specified in a routing table of the networking device.

6. The computer-implemented method of claim 4, wherein the network link dedication requests cause the first computing device to send, to a networking device of the at least one intermediary networking device, a first additional network link dedication request, wherein the first additional network link dedication request causes the networking device to send a second additional network link dedication request to an aggregation layer switch to dedicate a network link to the first compute instance, and wherein the aggregation layer switch dedicates the network link by removing a route associated with the first compute instance from an equal-cost multi-path (ECMP) routing table at the aggregation layer switch.

7. The computer-implemented method of claim 4, wherein the hardware virtualization service includes a data store storing state information about network links managed by the hardware virtualization service, and wherein the data store indicates, for each of a plurality of network links, a pair of devices connected by the network link, whether the network link is part of a shared pool of network links or dedicated to a compute instance, and performance characteristics of the network link; and wherein the method further comprises updating the data store to reflect the dedication of network links for the dedicated networking path.

8. The computer-implemented method of claim 4, wherein the hardware virtualization service includes a data store storing state information about network links managed by the hardware virtualization service, wherein the state information about the network links includes network capacity information associated with the network links and with a networked computing environment in which the first compute instance and second compute instance operate, and wherein the method further comprises determining, based on state information stored in the data store, whether sufficient networking capacity exists to dedicate network links for the dedicated networking path.

9. The computer-implemented method of claim 4, further comprising:

receiving a request to release network links of the dedicated networking path back into one or more shared pools of network links; and sending dedicated network link release requests to the first computing device and to the second computing device, wherein the dedicated network link release requests cause the first computing device to release the first network link to a first shared pool of network links associated with the first computing device and further cause the second computing device to release the second network link to a second shared pool of network links associated with the second computing device.

10. The computer-implemented method of claim 4, wherein the first compute instance and the second compute instance implement at least a portion of a distributed workload, and wherein execution of the distributed workload involves the exchange of network traffic between the first compute instance and the second compute instance using the dedicated networking path.

11. The computer-implemented method of claim 4, wherein the request identifies a processing cluster into which the compute instances are to be launched, and wherein the hardware virtualization service places the first compute instance and the second compute instance at the first computing device and the second computing device according to a placement strategy associated with the processing cluster.

12. The computer-implemented method of claim 4, further comprising:

receiving a request to reserve a dedicated networking path for two or more compute instances; and storing a dedicated network path reservation including data representing a set of network links to be used to establish the dedicated networking path upon request.

13. The computer-implemented method of claim 4, wherein the at least one intermediary networking device is part of a networking environment including a hierarchy of networking devices connecting computing devices of one or more data centers in which the hardware virtualization service provisions compute instances.

14. The computer-implemented method of claim 4, wherein the network link dedication requests are sent to the first computing device and to the second computing device using network link dedicated to control signal information sent and received by the first computing device and the second computing device.

15. The computer-implemented method of claim 4, wherein the first computing device and the second computing device are located in a provider substrate extension that is separate from the cloud provider network.

16. A system comprising:
a first one or more electronic devices to implement a hardware virtualization service in a cloud provider network, the hardware virtualization service including instructions that upon execution cause the hardware virtualization service to:
receive, a request to launch a plurality of compute instances including a first compute instance and a second compute instance, wherein the request further requests a dedicated networking path between the first compute instance and the second compute instance, wherein the dedicated networking path involves at least one intermediary networking device;
launch the first compute instance at a first computing device and the second compute instance at a second computing device; and
send network link dedication requests to the first computing device and the second computing device; and
a second one or more electronic devices to implement the first computing device, the first computing device including instructions that upon execution cause the first computing device to:
receive a network link dedication request identifying the first compute instance hosted by the first computing device;
select a network link associated with the first computing device to dedicate to the first compute instance;
modify networking configuration information to dedicate the network link to the first computing instance; and
send, to a next-hop networking device, a request to dedicate a network link to the first compute instance.

17. The system of claim 16, wherein the network link dedication requests cause the first computing device to send, to a networking device, an additional network link dedication request, and wherein the additional network link dedication request causes the networking device to remove a route associated with the first compute instance from an equal-cost multi-path (ECMP) set specified in a routing table of the networking device.

18. The system of claim 16, wherein the network link dedication requests cause the first computing device to send, to a networking device of the at least one intermediary networking device, a first additional network link dedication request, wherein the first additional network link causes the networking device to send a second additional network link dedication request to an aggregation layer switch to dedicate a network link to the first compute instance, and wherein the aggregation layer switch dedicates the network link by removing a route associated with the first compute instance from an equal-cost multi-path (ECMP) routing table at the aggregation layer switch.

19. The system of claim 16, wherein the hardware virtualization service includes a data store storing state information about network links managed by the hardware virtualization service, and wherein the data store indicates, for each of a plurality of network links, a pair of devices connected by the network link, whether the network link is part of a shared pool of network links or dedicated to a compute instance, and performance characteristics of the network link; and
wherein the hardware virtualization service further includes instructions that upon execution cause the hardware virtualization service to update the data store to reflect the dedication of network links for the dedicated networking path.

20. The system of claim 16, wherein the hardware virtualization service includes a data store storing state information about network links managed by the hardware virtualization service, wherein the state information about the network links includes network capacity information associated with the network links and with a networked computing environment in which the first compute instance and second compute instance operate, and wherein the hardware virtualization service further includes instructions that upon execution cause the hardware virtualization service to update determine, based on state information stored in the data store, whether sufficient networking capacity exists to dedicate network links for the dedicated networking path.

* * * * *